United States Patent
Nyberg et al.

(10) Patent No.: US 6,845,123 B1
(45) Date of Patent: Jan. 18, 2005

(54) FREQUENCY HOPPING SEQUENCE ALLOCATION

(75) Inventors: Henrik Nyberg, Stockholm (SE); Stephen G. Craig, Tullinge (SE); Sverker Magnusson, Stockholm (SE); Erik Edgren, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/512,629

(22) Filed: Feb. 25, 2000

(51) Int. Cl.[7] ............................................. H04B 1/713
(52) U.S. Cl. ................................. 375/133; 375/132
(58) Field of Search .............................. 375/132, 133, 375/134, 135, 136, 137, 130; 370/480; 455/450, 517

(56) References Cited

U.S. PATENT DOCUMENTS

| | | | |
|---|---|---|---|
| 4,850,036 A | * 7/1989 | Smith ......................... | 455/502 |
| 5,287,384 A | * 2/1994 | Avery et al. ................ | 375/134 |
| 5,394,433 A | * 2/1995 | Bantz et al. ................ | 375/132 |
| 5,515,369 A | * 5/1996 | Flammer et al. ............ | 370/480 |
| 5,528,622 A | * 6/1996 | Cadd et al. ................. | 370/447 |
| 5,586,120 A | * 12/1996 | Cadd ........................... | 370/468 |
| 5,887,022 A | * 3/1999 | Lee et al. .................... | 375/132 |
| 5,937,002 A | 8/1999 | Andersson et al. ......... | 375/131 |
| 6,009,332 A | 12/1999 | Haartsen ..................... | 455/450 |
| 6,128,327 A | * 10/2000 | Bird et al. ................... | 375/132 |
| 6,223,048 B1 | * 4/2001 | Noll Barreto et al. ...... | 455/517 |
| 6,549,784 B1 | * 4/2003 | Kostic et al. ............... | 455/501 |

FOREIGN PATENT DOCUMENTS

| | | | |
|---|---|---|---|
| GB | 2 203 314 | 10/1988 | |
| JP | 10065648 A | * 3/1998 | ............ H04J/13/06 |

* cited by examiner

Primary Examiner—Chieh M. Fan (57) ABSTRACT

In a telecommunications system that employs frequency hopping techniques, network performance can be significantly improved by taking into consideration the level of interaction (e.g., the collision rate) between frequency hopping sequences, when allocating the frequency hopping sequences throughout the network. In a cellular network, this may be accomplished by deriving a network performance measure as a function of a current allocation of frequency hopping sequences for a number of cells and as a function of an expected collision rate (between the frequency hopping sequences) that appear for the current allocation. The frequency hopping sequences are then re-allocated amongst one or more cells until network performance is optimized. The allocation of frequency hopping sequences that results in optimized network performance may then be used for assigning frequency hopping sequences to new or existing connections (e.g., cellular calls) within a corresponding cell.

19 Claims, 6 Drawing Sheets

| CELL | 1 | 2 | 3 | ... | n |
|------|---|---|---|-----|---|
| 1    | ...| X |   |     |   |
| 2    | Y | ...|  |     |   |
| 3    |   |   |   |     |   |
| ⋮    |   |   |   |     |   |
| n    |   |   |   |     | ...|

| Cells | MAIO prio 1 | MAIO prio 2 | MAIO prio 3 | .... | MAIO prio N |
|---|---|---|---|---|---|
| 1 | 0 | 2 | 4 | .... | 1 |
| 2 | 2 | 3 | 4 | ... | N-1 |
| 3 | 2 | 3 | 4 | ... | N-1 |

FIG. 6A

| MAIO priority | TS 1 | TS 2 | ... | TS 4 | TS 8 |
|---|---|---|---|---|---|
| 1 | O | O | ... | F | O |
| 2 | F | O | ... | O | O |
| 3 | F | F |  | O | F |

FIG. 6B

KEY: "O" → OCCUPIED
"F" → FREE

| Cell | HSN | FN Shift | MAIOs in priority order | | | | |
|---|---|---|---|---|---|---|---|
| 1 | 1 | 0 | 0 | 2 | 4 | 8 | 6 |
| 2 | 1 | 100 | 1 | 3 | 4 | 0 | 14 |
| 3 | 37 | 0 | 0 | 2 | 4 | 10 | 12 |

FIG. 6C

FREQUENCY HOPPING SEQUENCE ALLOCATION

FIELD OF INVENTION

The present invention generally relates the field of telecommunications. More particularly, the present invention relates to allocating frequency hopping sequences in radio telecommunications systems, such as cellular radio telecommunications systems, which employ frequency hopping techniques.

BACKGROUND

To improve system performance, radio frequency channel (RFCH) hopping, referred to herein as frequency hopping, is often employed in cellular, radio telecommunications systems, such as the Global System for Mobile Communication (GSM). In general, frequency hopping improves system performance by introducing frequency diversity and interference diversity, as will be explained in detail below. Frequency hopping is a well-known technique.

Frequency diversity is achieved by transmitting and receiving each radio telecommunications signal on a sequence of frequencies over time. Each signal is transmitted and received over a sequence of frequencies because radio signals are often subject to amplitude variations called Rayleigh fading. However, Rayleigh fading at a specific geographic location typically affects radio signals carried on certain frequencies more so than other frequencies. Thus, transmitting and receiving a radio telecommunications signal over a sequence of different frequencies increases the likelihood that the signal will be received correctly, as it is unlikely that Rayleigh fading will significantly impact each and every frequency over which the radio telecommunications signal is being transmitted. Accordingly, signal quality is improved and overall system performance is enhanced.

On the other hand, Interference diversity works as follows. In addition to fading, a radio signal is often subject to varying degrees of interference caused by traffic on the same frequency channel (i.e., co-channel interference) and traffic on an adjacent frequency channel (i.e., adjacent channel interference). If co-channel and/or adjacent channel interference is substantial, the signal quality associated with the radio signal may be severely impacted, so much so, that the connection may be dropped. In theory, frequency hopping, through the introduction of interference diversity, spreads the co-channel and adjacent channel interference amongst numerous end-users, such that the co-channel and adjacent channel interference experienced by any one particular end-user is diversified. The overall effect is to raise signal quality levels across the network, thereby improving overall system performance.

In accordance with typical frequency hopping schemes, each telecommunications connection, or for the purpose of simplicity, each end-user (e.g., cellular telephone or other mobile station) is assigned a frequency hopping sequence (FHS) at set-up (e.g., call set-up), where the FHS defines the sequence of frequencies over which the corresponding signal will be transmitted and received. Each FHS, in turn, consists of two basic parameters: a hopping sequence number (HSN) and a frequency offset (FO). The GSM standard defines the HSN as an integer number that may range from 0 through 63, where each HSN value 0 . . . 63 represents a different sequence of frequencies. To simplify the following discussion, specific HSNs are identified by a subscripted integer value. Thus, for example, an HSN equal to 63 will be represented as $HSN_{63}$. In contrast, the FO is an integer number that ranges from 0 through N−1, where N represents the number of frequencies that are available for frequency hopping, and where FO represents a displacement in the frequency domain from a corresponding HSN. In the GSM, FO is called the Mobile Allocation Index Offset (MAIO). Again, to simplify the following discussion, specific MAIOs are identified herein by a subscripted integer value. For example, a MAIO equal to 20, would be represented as $MAIO_{20}$. In general, each cell is assigned an HSN, where one skilled in the art will understand that a cell represents a geographical area in which a base station, or base transceiver station, communications with end-users (e.g., mobile stations) over a given set of RFCHs. In contrast, each end-user is assigned a MAIO. Thus, if an end-user has been assigned $MAIO_1$, and the end-user is operating in a cell where the corresponding base station has been assigned $HSN_1$, the FHS associated with the end-user is defined, in whole or in-part, by $HSN_1$ and $MAIO_1$.

Figure 1:
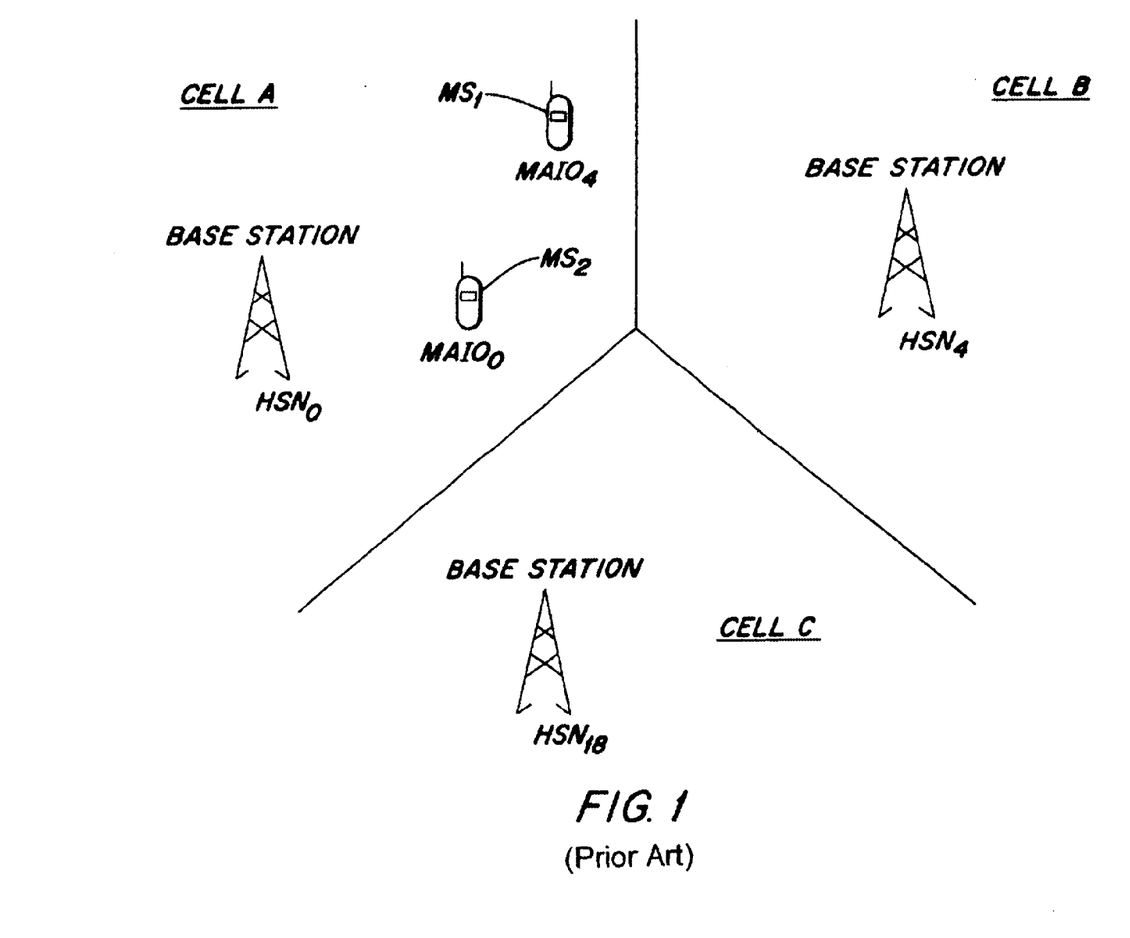
FIG. 1 illustrates the concept of hopping sequence numbers (HSNs) and frequency offsets (FOs), which are referred to as mobile allocation index offsets (MAIOs) in the Global System for Mobile Communication (GSM)

FIG. 1 illustrates the concept of HSNs and MAIOs. More specifically, FIG. 1 depicts three cells A, B and C associated with an exemplary cellular telecommunication system, such as the GSM. In addition, FIG. 1 indicates that cells A, B and C have been assigned $HSN_0$, $HSN_4$ and $HSN_{18}$, respectively. If, for example, there are 16 frequencies, $f_0$ through $f_{15}$, available for frequency hopping, in each of cells A, B and C, the sequence of frequencies associated with $HSN_0$ might include the following sequence: $f_1$, $f_5$, $f_{12}$, $f_9$, $f_6$, $f_7$, $f_0$, $f_{15}$, $f_{12}$, $f_4$, $f_1$. FIG. 1 also indicates that there are two end-users (e.g., two cellular telephones or other mobile stations) operating in cell A. The first mobile station ($MS_1$) has been assigned $MAIO_4$, while the second mobile station ($MS_2$) has been assigned $MAIO_0$. Accordingly, the FHS for $MS_1$ is defined, in whole or in-part, by $HSN_0$ and $MAIO_4$. Assuming $MAIO_4$ represents a frequency offset of +4 frequency channels, $MS_1$ will communicate over a sequence of frequencies that includes the following sequence: $f_5$, $f_9$, $f_0$, $f_{13}$, $f_{10}$, $f_{11}$, $f_4$, $f_3$, $f_0$, $f_8$, $f_5$. It then follows that $MS_2$, which has been assigned $MAIO_0$, will communicate over a sequence of frequencies that includes the following sequence: $F_1$, $F_5$, $F_{12}$, $F_9$, $F_6$, $F_7$, $F_0$, $F_{15}$, $F_{12}$, $F_4$, $F_1$.

In order to minimize co-channel interference (i.e., the interference between end-users in two different cells communicating over the same frequency channel at the same time), and to a lesser extent, adjacent channel interference (i.e., the interference between end-users communicating over adjacent frequency channels at the same time), one skilled in the art will readily appreciate the desire to widely distribute FHSs that have the potential to cause co-channel interference and/or adjacent channel interference. By widely distributing these FHSs, the physical distance between two end-users operating on the same frequency channel, or on adjacent frequency channels, increases, which in turn, tends to reduce the adverse effects of co-channel and/or adjacent channel interference. However, very few FHS allocation strategies have been devised. In fact, the GSM standards (e.g., ETSI TS 100 908) do not define any such strategy. Accordingly, the allocation of FHSs is typically achieved in a somewhat ad-hoc or random manner. Thus, while frequency hopping techniques help to improve signal quality levels and overall network performance, the signal quality levels achieved are far from optimal.

To overcome the performance deficiencies associated with the ad-hoc or random FHS allocation strategy associated with GSM, International Patent Publication No. WO 96/02980, entitled "Channel Hopping in a Radio Communication System," describes a measurement-based FHS allocation method. More particularly, this publication describes a method that involves measuring the performance associated with each FHS. FHSs that exhibit greater measures of performance may be assigned to existing calls to replace FHSs that exhibit lesser measures of performance.

Neither the ad-hoc approach associated with the GSM, nor the measurement-based approach described in International Patent Publication No. WO 96/02980, directly rely on the level of interaction, i.e., the number of "collisions", between FHSs. As the present invention is primarily focused on minimizing co-channel interference, the term "collision", in the context of the present invention, refers to the situation where two mobile stations hopping over two different FHSs simultaneously hop to the same frequency. However, it will be understood that the present invention could be extended to include provisions for minimizing adjacent channel interference, whereby the term "collision" might refer to the situation where two mobile stations, hopping over two different FHSs, simultaneously hop to adjacent frequencies.

Figure 2:
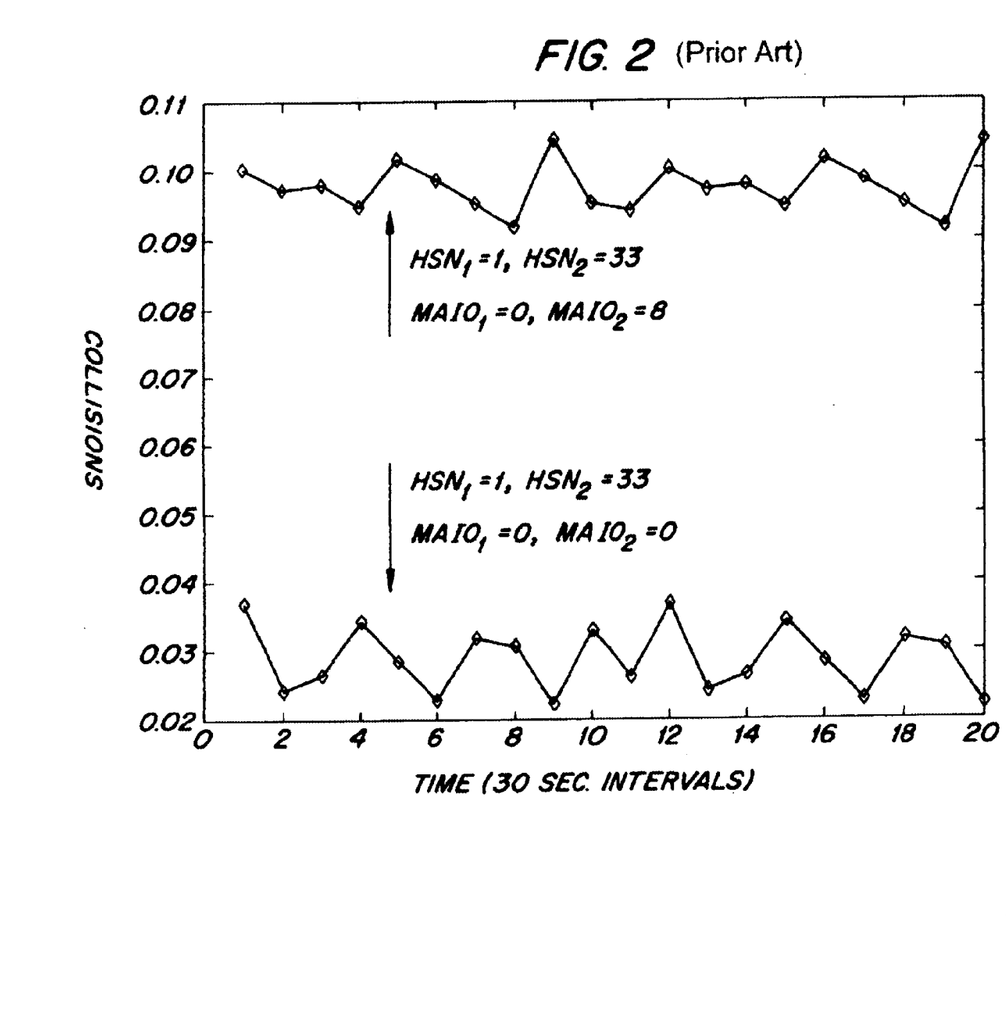
FIG. 2 illustrates the interaction in terms of the number of collisions, over twenty 30-second time intervals, between a first exemplary frequency hopping sequence (FHS) and two different FHSs.

FIG. 2 illustrates the interaction, in terms of collision rate, over twenty 30-second time intervals, between a first exemplary FHS and two different FHSs. More specifically, FIG. 2 shows the number of collisions occurring between a first FHS, defined by $HSN_1$ and $MAIO_0$, and a second FHS, defined by $HSN_{33}$ and $MAIO_8$. FIG. 2 also shows the number of collisions occurring between the first FHS and a third FHS, defined by $HSN_{33}$ and $MAIO_0$. As indicated, the level of interaction, that is, the number of collisions, associated with the former FHS pair is significantly large as compared to the level of interaction associated with the latter.

Given the fact that the level of interaction between FHSs can vary significantly, as illustrated in FIG. 2, and given the fact that greater levels of interaction can adversely affect the signal quality of a call, it would be highly desirable to provide a frequency hopping technique, for use in telecommunications systems, such as cellular radio telecommunications systems, that takes the level of interaction between FHSs directly into account when allocating and assigning FHSs. Such a technique would be particularly desirable for use in networks with a tight frequency reuse plan (e.g., 1-reuse).

SUMMARY OF THE INVENTION

The present invention involves a frequency hopping technique, whereby FHSs are allocated in such a way that the risk of collision between FHSs assigned to potentially strong interferers is minimized. In general, the present invention accomplishes this through the execution of a FHS allocation algorithm which, among other things, derives collision rate information for pairs of FHSs. Then, in conjunction with information relating to the manner in which FHSs are to be allocated for individual connections (e.g., cellular calls), the FHS allocation algorithm prioritizes FHSs for each cell, wherein the assignment of a particular FHS for a specific call, at call set-up or during an on-going call, becomes a matter of selecting the most appropriate FHS, based on the prioritized, FHS allocation information.

Accordingly, it is an object of the present invention to effectively allocate and assign FHSs.

It is another object of the present invention improve signal quality levels by minimizing co-channel interference, and to a lesser extent, adjacent channel interference, through the employment of an effective FHS allocation technique.

It is still another object of the present invention to provide a FHS allocation technique that takes into consideration, the level of interaction between FHS pairs.

In accordance with a first aspect of the present invention, the above-identified and other objectives are achieved through a method of assigning a frequency hopping sequence in a telecommunications network. The method involves allocating a frequency hopping sequence to a cell within the network as a function of a level of interaction between the frequency hopping sequence and each of a plurality of other frequency hopping sequences. The allocated frequency hopping sequence is then selected for a connection associated with the cell, in accordance with a frequency hopping sequence allocation strategy.

In accordance with a second aspect of the present invention, the above-identified and other objectives are achieved through a method of allocating a plurality of frequency hopping sequences in a cellular telecommunications network. The method involves deriving a network performance measurement as a function of a current allocation of the plurality of frequency hopping sequences amongst a number of cells, and as a function of a network collision measure. The one or more of the plurality of frequency hopping sequences are then re-allocated until network performance is optimized. The allocation of frequency hopping sequences that resulted in optimized network performance is ultimately maintained.

In accordance with a third aspect of the present invention, the above-identified and other objectives are achieved through a method of allocating frequency hopping sequences to each of a number of cells in a cellular telecommunications network. The method involves determining an expected collision rate between each of a number of frequency hopping sequence pairs, identifying a frequency offset allocation method, and allocating frequency hopping sequences for each cell. Network performance is then measured, based on the present allocation of frequency hopping sequences for each cell, and based on the expected collision rate between each of the number of frequency hopping sequence pairs. The frequency hopping sequences are re-allocated until it is determined that network performance is optimized, and based on the allocation of frequency hopping sequences that represents optimized network performance, and based on the frequency offset allocation method, one or more frequency hopping sequence allocation tables are constructed, which identify a prioritized listing of allocated frequency hopping sequences for each cell.

BRIEF DESCRIPTION OF THE FIGURES

The objectives and advantages of the present invention will be understood by reading the following detailed description in conjunction with the drawings, in which.

DETAILED DESCRIPTION OF THE INVENTION

The present invention involves the allocation of, and ultimately the assignment of, FHSs in a radio telecommunications system, such as the GSM, which employ frequency hopping to enhance signal quality and improve network performance. In accordance with exemplary embodiments of the present invention, the allocation and assignment of FHSs is, in part, based on a level of interaction between FHS pairs, where the level of interaction between a pair of FHSs is measured in terms of a collision rate, or more precisely, a probability of collision between the two FHSs which make up the FHS pair. While the thrust of the present invention is to effectively allocate and assign FHSs based on collision rate information, additional factors may be considered, as explained in greater detail below.

Each FHS, as explained above, is defined, in whole or in-part, by a HSN and a MAIO. In a cellular system, such as the GSM, each cell is assigned a HSN, whereas each end-user or mobile station (MS) operating in the cell is assigned a different MAIO. Although the network operator can reassign HSNs to the cells it is typical for a cell to maintain its assigned HSN for a reasonably long period of time. In contrast, MAIOs are assigned to MSs whenever a new connection is established (e.g., at call set-up), or during an existing call, if the signal quality associated with the existing call is prohibitively low.

Figure 3:
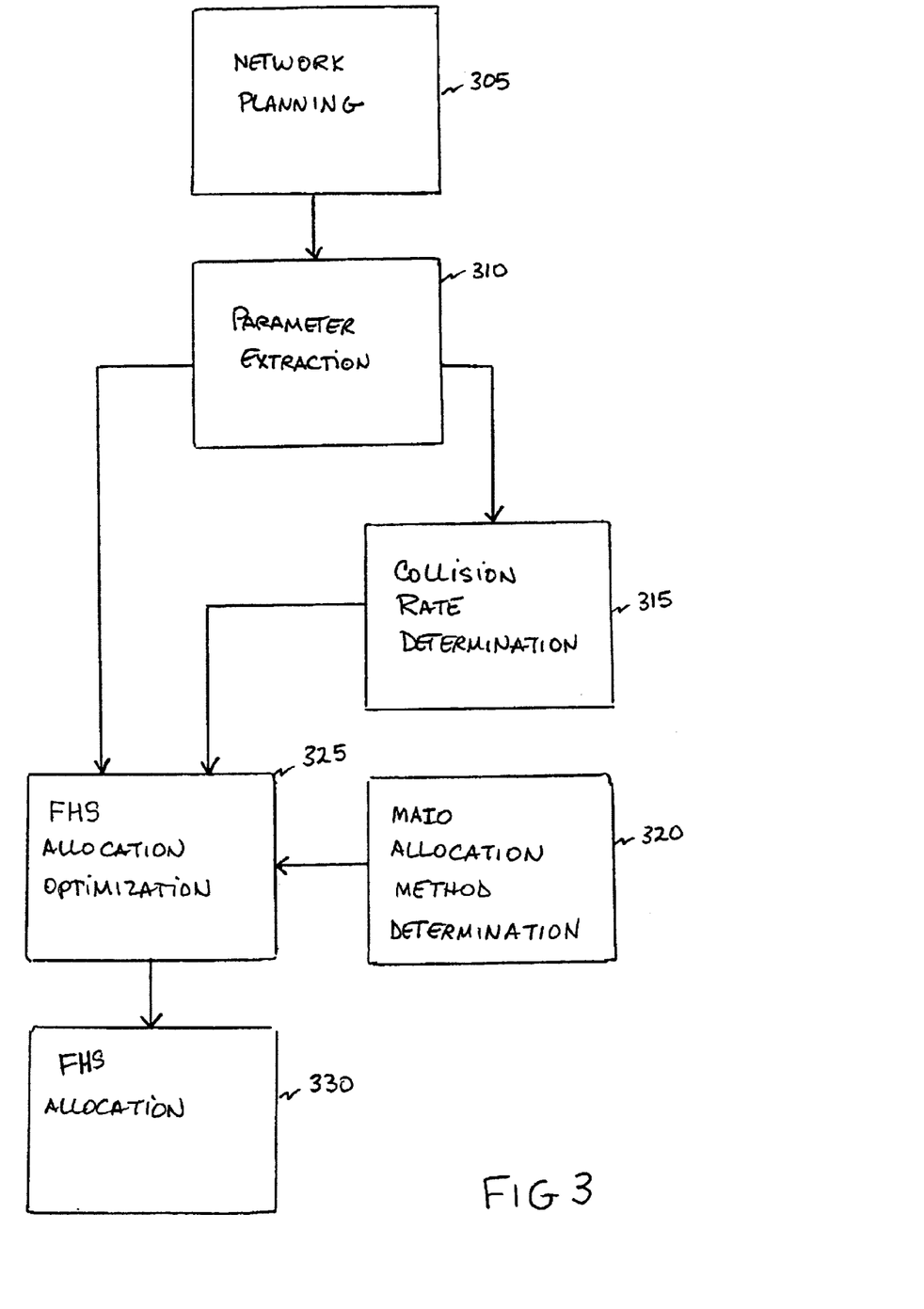
FIG. 3 is a flowchart which illustrates the processes associated with a FHS allocation algorithm in accordance with exemplary embodiments of the present invention.

FIG. 3 is a flowchart which illustrates the basic steps or processes associated with a FHS allocation algorithm in accordance with exemplary embodiments of the present invention. As shown, the FHS allocation algorithm involves six basic processes: network planning, parameter extraction, collision rate determination, MAIO allocation method determination, FHS allocation optimization, and FHS allocation. Each of these processes are now described in greater detail herein below.

In FIG. 3, the network planning process is represented by block 305. Network planning, or more specifically, cellular network planning, essentially involves aspects of network design, where the ultimate purpose is to ensure that the network provides adequate coverage and capacity to meet the needs of its subscribers. Two of the more significant tasks that are typically associated with cellular network planning are 1) determining the number and location of the cells that make up the network coverage area, and 2) determining a frequency usage strategy. The latter of the two tasks may, in turn, involve establishing frequency reuse patterns, where a frequency reuse pattern defines the distance, often measured by a number of cells, separating two co-channel cells which are capable of transmitting and receiving signals over the same frequencies or FHSs; determining the total number of frequencies that are available; and establishing frequency groupings. Network planning is, in general, a well known process.

In FIG. 3, the parameter extraction process is represented by block 310. In order to effectively implement the FHS allocation algorithm according to exemplary embodiments of the present invention, certain information from the network planning process is necessary. This information may include the size of the frequency groupings, HSNs, MAIOs, the number of cells that make up the network, or the number of cells involved in the FHS allocation process, cell relations data, and traffic intensity data.

Figure 4:
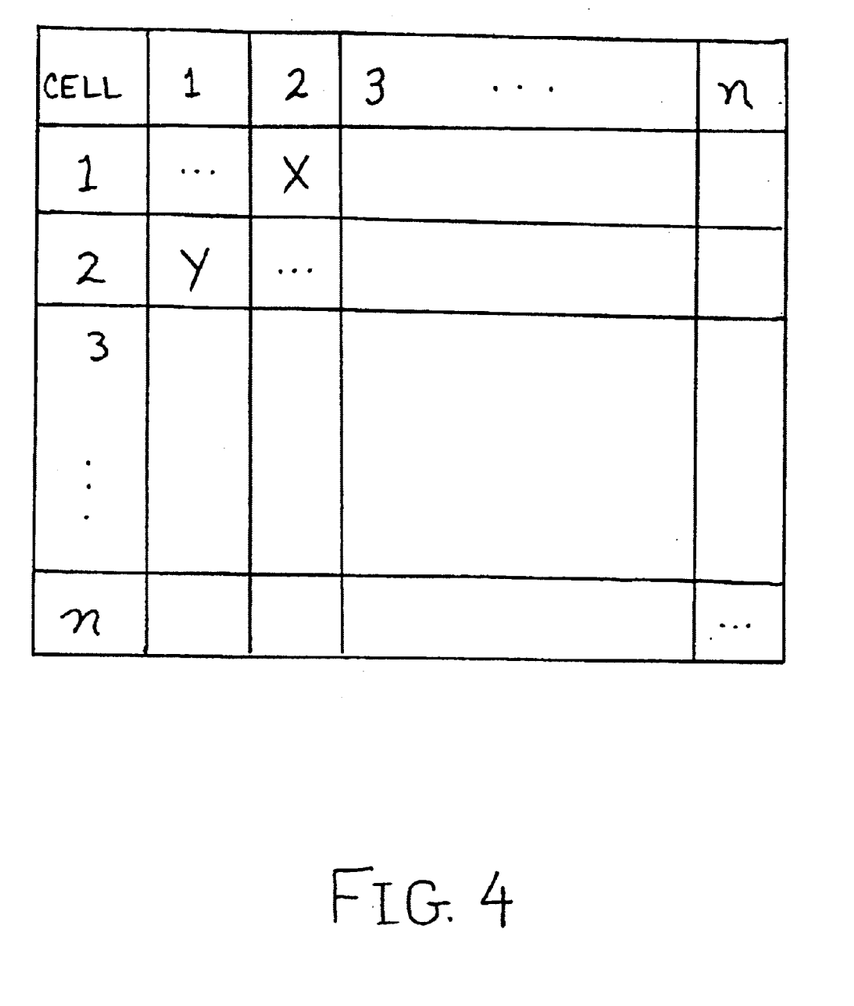
FIG. 4 illustrates an exemplary Intercell Dependency Matrix (ICDM)

Cell relations refers to the influence that one cell has on another cell, particularly with respect to co-channel interference. One way in which a network might measure and maintain cell relations data is through an Intercell Dependency Matrix (ICDM). FIG. 4 illustrates an exemplary ICDM. As shown, the ICDM comprises a matrix element for each pair of cells 1 through n. The value associated with each element reflects an amount of downlink interference that a first cell has on a second cell. Thus, for example, the value X associated with matrix element 2,1 reflects an amount of interference (e.g., co-channel interference) experienced by operations in cell 1 as a result of operations in cell 2. More particularly, the value X might represent the percentage of mobile stations in cell 1 that would be interfered (i.e., percentage interfered traffic or "PIT") as a result of operations in cell 2. Similarly, the value Y associated with matrix element 1,2 reflects an amount of interference experienced by operations in cell 2 as a result of operations in cell 1. A total cell relations data value associated with, for example, cells 1 and 2, might be quantified in any number of different ways, including the summation of the two values X and Y. For further information regarding ICDMs, see Timner et al., "Estimating the InterCell Dependency Matrix in a GSM Network", Proceedings of the $50^{th}$ Vehicular Technology Conference (VTC), pp. 3024–3028 (1999).

Traffic intensity data, on the other hand, refers to the expected number of end-users, or calls, in a cell at any given period of time. Traffic intensity is often referred to as occupancy level. For purposes of the present invention, the term traffic intensity refers to the "offered" traffic intensity, not the actual or "carried" traffic intensity, where the offered traffic intensity is defined as the arrival intensity of calls, multiplied by expected call duration.

In FIG. 3, the collision rate calculation process is presented by block 315. In accordance with exemplary embodiments of the present invention, collision rates are derived for each FHS pair, where each FHS pair is defined, in whole or in-part, by a corresponding HSN and a corresponding MAIO, as explained above. The collision rate for a given FHS pair may be derived by comparing the actual sequence of frequencies associated with a first FHS, e.g., one defined by $HSN_1$ and $MAIO_0$, and the sequence of frequencies associated with a second FHS, e.g., defined by $HSN_2$ and $MAIO_0$. The collision rate associated with the first and second FHS is then derived as a function of the number of occurrences, over a given period of time, where the two FHSs occupy the same space in both the time and frequency domains. In addition to the HSN and the MAIO, a FHS may be further defined by a third parameter which is herein referred to as the frame number shift (FNS). As will be explained in greater detail herein below, the FNS associated with each of two FHSs can also effect the collision rate of a corresponding FHS pair.

In cellular radio telecommunications systems, any one of several well-known access strategies may be employed, for example, FDMA, CDMA, or TDMA. The GSM is a TDMA based system. In TDMA based systems, the time domain is divided into time frames. Each time frame is then further divided into a number of time slots, for example, 8 time slots. As one skilled in the art will readily appreciate, each frequency-time slot combination constitutes a different physical channel. Moreover, it is anticipated that synchronized TDMA based networks will employ a basic frame number sequence for the entire network. However, the frame number associated with any one cell (C), $FN_{(C,t)}$, at a given instant of time (t) is a function of both the basic frame number sequence, $FN_{BASIC}(t)$, and a corresponding $FNS_{(C)}$ associated with cell C, as expressed in equation (I) below:

$$FN_{(C,t)}=(FNS_{(C)}+FN_{BASIC}(t))mod FN_{MAX} \qquad (1)$$

where $FN_{MAX}$ represents the highest possible frame number, which the GSM standards (e.g., GSM 5.02) defines as 2,715,647. Thus, in calculating the collision rate for a given FHS pair, the FNS for each of the FHSs that make up the pair may be iteratively adjusted in order to identify the FNSs that cause the FHS pair to exhibit the lowest possible collision rate.

In FIG. 3, the MAIO allocation method determination process is represented by block 320. The MAIO allocation method determination process defines the MAIO allocation method that is to be used, for example, when a new connection or call in a cell is established, or during an existing call if the signal quality associated with the existing call is unsatisfactory. One skilled in the art, however, will appreciate that any number of different MAIO allocation methods may be employed. The MAIO allocation method or methods employed will typically depend upon the type of information that is available. Three different MAIO allocation methods are now briefly described below, for purposes of illustration.

In a first exemplary MAIO allocation method, it is assumed that information relating to the signal quality required by calls is not available at call set-up. In accordance with this first exemplary MAIO allocation method, MAIOs are arranged in a prioritized order for each cell, where the prioritized order is established during the FHS allocation optimization process. At set-up, the new call is assigned the allocated MAIO that exhibits the highest priority level, assuming the MAIO exhibiting the highest priority level is available for use.

In a second exemplary MAIO allocation method, it is assumed that certain information regarding the present quality of an existing call is available. It is further assumed that MAIOs may be re-assigned for existing calls, if the present quality of the existing call is unsatisfactory. In accordance with this second exemplary MAIO allocation method, a certain number of MAIOs that exhibit lower collision rates are reserved so that they may be assigned to existing calls that are experiencing particularly low or unsatisfactory signal quality levels. At set-up, however, MAIOs may be assigned to calls in accordance with the first exemplary MAIO allocation method.

In a third exemplary MAIO allocation method, information relating to MAIO usage in co-channel cells is assumed to be available. In accordance with this third exemplary MAIO allocation method, the assignment of MAIOs based on the highest priority level, in accordance with the first exemplary MAIO allocation method, and the reservation of certain MAIOs for existing calls experiencing particularly poor signal quality, in accordance with the second exemplary MAIO allocation method, is accomplished in view of information relating to the present utilization of certain MAIOs in co-channel cells.

In FIG. 3, the FHS allocation optimization process is represented by block 325. The FHS allocation optimization process involves prioritizing FHSs for each cell. As shown in FIG. 3, the FHS allocation optimization process is based on information that is derived by the collision rate determination process and on information that is provided by the MAIO allocation method determination process. In addition, the FHS allocation optimization process may rely on additional network planning information described above. This additional information may include, for example, the aforementioned cells relations data, and traffic intensity data.

Figure 5:
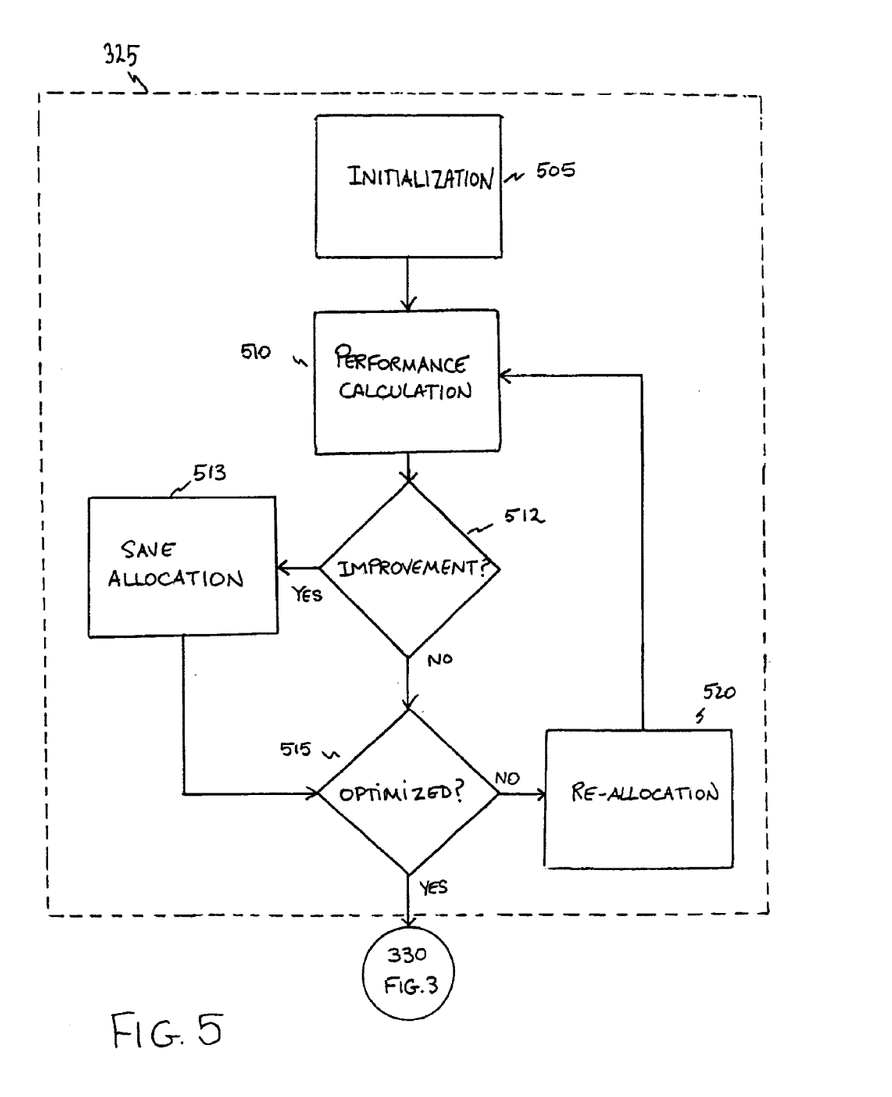
FIG. 5 illustrates a technique for implementing a FHS allocation optimization process, in accordance with exemplary embodiments of the present invention.

FIG. 5 illustrates an exemplary technique for implementing the FHS allocation optimization process. In general, the exemplary technique for implementing the FHS allocation optimization process comprises six basic procedures: an initialization procedure 505, a performance calculation procedure 510, a network performance improvement determination procedure 512, an FHS allocation save procedure 513, an optimization determination procedure 515, and a re-allocation procedure 520. Each of these basic procedures will now be described in greater detail.

Block 505 represents the initialization procedure, wherein FHSs are allocated in an initial order for each cell in the network, and wherein each FHS is, as stated previously, defined by a corresponding HSN, MAIO, and FNS. This initial allocation may be achieved using any number of different methods. For instance, the FHSs might initially be allocated based on previously derived collision rate information, where FHS pairs that appear to exhibit greater levels of interaction are widely dispersed among cells that are physically separated from each other by a substantial distance, while FHS pairs that appear to exhibit lesser levels of interaction are distributed among cells that are more proximately located with respect to one another. Alternatively, the FHSs might initially be allocated in a purely random matter, in accordance with conventional techniques, which, as previously stated, view the FHSs as being mutually independent. Once the initial FHS allocation is complete, a network performance measure is accomplished.

Block 510 represents the procedure for calculating the network performance measure. In accordance with the preferred embodiment of the present invention, network performance for a given allocation (a) of FHSs is measured by the expected, weighted mean network collision rate $R(a)$, which is a function of the weighted, average collision rate for each of a number of cell pairs in the network. One skilled in the art will appreciate, however, that there are other ways to measure network performance for a given allocation (a) of FHSs. One such alternative for measuring network performance involves calculating the expected, weighted maximum network collision rate $R_{max}(a)$, which is a function of the weighted, maximum expected collision rate for each of a number of cell pairs in the network. Yet another alternative for measuring network performance involves calculating network collision rate that is a linear, combination of both the expected, weighted mean network collision rate $R(a)$ and the expected, weighted maximum network collision rate $R_{max}(a)$.

The network performance measure for a given allocation (a) of FHSs, as given by the expected, weighted mean network collision rate $R(a)$, in accordance with the preferred embodiment of the present invention, is a function of the following data: the number of cells (n) that make up the network, or a portion thereof; cell relations data $W(C_1, C_2)$ for each cell pair $(C_1, C_2)$, where the cell relations data reflects an expected level of interference (e.g., co-channel interference) between a call associated with the first cell $C_1$, and a call associated with the second cell $C_2$; the traffic intensity offered in each cell, for example, given by the number of connections or calls per second multiplied by an expected holding time per connection; the number of frequencies per cell (N), assuming a standard case where all cells use the same number of frequencies; and the collision rates $r(N, HSN_1, HSN_2, FNS_1, FNS_2, MAIO_1, MAIO_2)$ for each FHS pair, assuming there are N frequencies available for hopping in each of the n number of cells. In the more general case, where the number of frequencies for hopping in each cell is not necessarily equal, the number of frequencies associated with each of the n number of cells may be given by $N_1 \ldots N_n$. Similarly, the number of MAIOs available in each of the n number of cells would be given by $N_c$, where c equals $1 \ldots N$, and where the integer value associated with any given MAIO will range from 0 through $N_C-1$.

Further in accordance with a preferred embodiment of the present invention, the expected, weighted mean network collision rate R(a) may be derived using equation (2) below:

$$R(a) = \sum_{C_1=1}^{n} \sum_{C_2=1}^{n} W(C_1, C_2) * r_{avg}(a)(C_1, C_2) \tag{2}$$

where $C_2$ cannot equal $C_1$. Furthermore, the variable n represents the number of cells, and more specifically, co-channel cells, in the network, or a portion thereof covered by the FHS allocation process. The term $W(C_1, C_2)$ represents a weighting factor for the cell pair consisting of cell C1 and cell C2, where the weighting factor $W(C_1, C_2)$ is a function of the expected level of interference (e.g., co-channel interference) between a call in cell $C_1$ and a call in cell $C_2$. The expected level of interference is, in a preferred embodiment of the present invention, defined by the aforementioned cell relations data. The term $r_{avg}(a)(C_1, C_2)$, of course, represents the average or mean collision rate between two co-channel cells $C_1$ and $C_2$ given FHS allocation (a).

Still further in accordance with the preferred embodiment of the present invention, the average or mean expected collision rate for two co-channel cells $C_1$ and $C_2$, each having, respectively, $N_1$ and $N_2$ number of frequencies available for hopping, $r_{avg}(a)(C_1, C_2)$ may be derived using equation (3) below.

$$r_{avg}(a)(C_1, C_2) = \tag{3}$$
$$\sum_{MAIO_1=0}^{N_1-1} \sum_{MAIO_2=0}^{N_2-1} r(HSN_{C1}, HSN_{C2}, MAIO_1, MAIO_2, FNS_{C1}, FNS_{C2}) *$$
$$II(a)(C_1, C_2, MAIO_1, MAIO_2)$$

Equation (3), as shown, accommodates the situation where N, the number of frequencies available for hopping in cell $C_1$, and $N_2$, the number of frequencies available for hopping in cell $C_2$, differ. However, as stated previously, $N_1$ and $N_2$ are typically equal to one another. Moreover, equation (3) indicates that the mean expected collision rate for cells $C_1$ and $C_2$ depends on two terms: a first term $r(HSN_{C1}, HSN_{C2}, MAIO_1, MAIO_2, FNS_{C1}, FNS_{C2})$, and a second term $II(a)(C_1, C_2, MAIO_1, MAIO_2)$.

The first of these two terms $r(HSN_{C1}, HSN_{C2}, MAIO_1, MAIO_2, FNS_{C1}, FNS_{C2})$ represents the overall fraction of collisions between two FHSs. The first FHS is defined by the HSN allocated to cell $C_1$; $MAIO_1$, which ranges from 0 through $N_1-1$; and $FNS_{C1}$. The second FHS being defined by the HSN allocated to cell $C_2$; $MAIO_2$, which ranges from 0 through $N_2-1$; and $FNS_{C2}$. Both $FNS_{C1}$ and $FNS_{C2}$ will range from 0 through a maximum frame number $FN_{MAX}$.

The second of the two terms, $II(a)(C_1, C_2, MAIO_1, MAIO_2)$, represents the probability that $MAIO_1$ and $MAIO_2$ are simultaneously in use in cell $C_1$ and cell $C_2$ respectively. The probability that any two MAIOs are simultaneously in use in two co-channel cells $C_1$ and $C_2$ depends on the MAIO allocation method, as identified through the process represented by block 320 in FIG. 3. It also depends on a traffic intensity T. For example, if the first exemplary MAIO allocation method is employed, wherein new calls are assigned the MAIO having the highest priority level, the probability $II(a)(C_1, C_2, MAIO_1, MAIO_2)$ that a $MAIO_1$ and a $MAIO_2$ are simultaneously in use in cell $C_1$ and cell $C_2$, respectively, may be approximated in accordance with equation (4) below.

$$II(a)*C_1, C_2, MAIO_1, MAIO_2) = P_{C1}(T1, MAIO_1) * P_{C2}(T_1, MAIO_2) \tag{4}$$

In equation (4), the term $P_{C1}(T_1, MAIO_1)$ represents the probability that a new call in cell $C_1$ will be assigned $MAIO_1$, where the probability of such an event is given in equation (5):

$$P_{C1}(T_1, MAIO_1) = [E(T'_1, Priority(MAIO_1)-1) - E(T'_1, Priority(MAIO_1))]/(1 - E(T'_1, N_1)) \tag{5}$$

where the one-timeslot equivalent traffic intensity $T'_1$ is the solution to equation (6):

$$N_{TS} - T'_1(1 - E(T'_1, N_1)) = T_1(1 - E(T_1, N_{TS}-N_1)) \tag{6}$$

where $N_{TS}$ equals the number of timeslots per frame, which is typically 8 timeslots. The term priority($MAIO_1$) represents the priority level that has been assigned to $MAIO_1$, whereas the term E(T, k) is given by Erlang's loss formula in equation (7) below:

$$E(T,k) = \{T^k k!\}/\{1 + T + (T^2/2!) \ldots (T^k/k!)\} \tag{7}$$

where k equals $1, 2, 3 \ldots$, and the term E(T,0) equals 1.

Similarly, the term $P_{C2}(T_2, MAIO_2)$ in equation (4) above represents the probability that a new call in cell $C_2$ will be assigned $MAIO_2$, where the probability of such may be derived in the same manner as $P_{C1}(T_1, MAIO_1)$ as given in equation (5).

As stated, network performance for a given allocation (a) of FHSs may, alternatively, be measured by the expected, weighted maximum network collision rate $R_{max}(a)$. In accordance with this alternative embodiment, the expected, weighted maximum network collision rate $R_{max}(a)$ may be derived using equation (8) below:

$$R_{max}(a) = \sum_{C_0=1}^{n} \sum_{C_2=1}^{n} W(C_1, C_2) * r_{max}(a)(C_1, C_2) \tag{8}$$

where the term $r_{max}(a)(C_1, C_2)$ represents the maximum collision rate measure for two co-channel cells $C_1$ and $C_2$. Furthermore, the maximum collision rate measure for two co-channel cells $C_1$ and $C_2$ is given by equation (9):

$$r_{max}(a)C_1, C_2) = r(HSN_{C1}, HSN_{C2}, M'_1, M'_2, FNS_{C1}, FNS_{C2}) \tag{9}$$

where $M'_1$, and $M'_2$ each represent the $MAIO_1$ and $MAIO_2$ that maximize the product $r(HSN_{C1}, HSN_{C2}, MAIO_1, MAIO_2, FNS_{C1}, FNS_{C2}) * II(a)(C_1, C_2, MAIO_1, MAIO_2)$, and where $MAIO_1$ ranges from 0 through $N_1$ and $MAIO_2$ ranges from 0 through $N_2$. The term $II(a)(C_1, C_2 MAIO_1, MAIO_2)$ represents the probability that the MAIOs in use are, in fact, $MAIO_1$ and $MAIO_2$. Again, this probability depends upon the MAIO allocation method, as identified in accordance with block 320 in FIG. 3, and on traffic intensity.

Referring back to FIG. 5, the network performance calculation, derived in accordance with the procedure represented by block 510, is evaluated in order to determine if the new allocation of FHSs improves network performance.

This determination is illustrated by decision block 512. The decision may be accomplished by comparing the present network performance measure with a prior best network performance measure. Of course, the new allocation of FHSs will improve network performance during the first or initial iteration, as there is no prior measure of network performance available for comparison. If the new allocation results in improved network performance, in accordance with the 'YES' path out of decision block 512, the new allocation of FHSs is saved, as shown in block 513. If, however, the new allocation does not result in improved network performance, in accordance with the 'NO' path out of decision block 512, the new allocation is not saved.

Whether or not the new allocation results in improved network performance, a determination is then made as to whether network performance is optimized. This determination is represented by decision block 515. If it is determined that network performance has not yet been optimized by the currently saved FHS allocation, in accordance with the "NO" path out of decision block 515, a re-allocation procedure is accomplished in accordance with block 520.

In accordance with the preferred embodiment of the present invention, the re-allocation procedure represented by block 520 generally involves a process wherein a value for one FHS parameter, associated with one cell, is re-allocated at a time in an attempt to further optimize network performance. Each new value is taken from a pre-defined set of values that are valid for this one parameter. For example, a MAIO with a priority of 1 may be re-allocated with a new priority value of 0, where the new value is selected from amongst a set of values. If the selection results in a conflict in the one cell, or other cells, the conflicting parameter is re-allocated. Thus, if the value of MAIO priority 1 was set equal to 2, prior to being set equal to 0, and MAIO priority 4 was set equal to 0, MAIO priority 4 may now be set equal to 2. Network performance is then re-calculated and re-evaluated to determine if network performance has been improved and By optimized, in accordance with the procedures illustrated by blocks 510, 512, 513 and 515, as described above. As long as the network performance determination indicates that network performance is not optimized, the re-allocation procedure, in accordance with block 520, is repeated.

Again, the value of one FHS parameter is re-allocated in one of the n number of cells during each iteration of the re-allocation procedure illustrated in block 520. Thus, after fully re-allocating the value of the one FHS parameter (e.g., MAIO) in the one cell, the other parameters (e.g., FNS and HSN) which make up an FHS, are varied, one at a time. Once all of the parameter values in the one cell have been fully re-allocated, the values associated with a first parameter in a next cell may be varied in a similar manner. Of course, one skilled in the art will understand that other strategies may be employed in re-allocating the FHS parameters in accordance with the re-allocation procedure represented by block 520.

Once it is determined that network performance has been optimized, in accordance with the "YES" path out of decision block 515, the algorithm illustrated in FIG. 3 proceeds to the FHS allocation process, which is represented by block 330. Although there are any number of techniques that may be employed to determine if network performance is optimized, one exemplary technique involves comparing the present network performance measurement with a previous network performance measurement. If, after a predetermined number of FHS allocation optimization iterations, the present network performance measurement fails to exceed the previous network performance measurement by at least a minimum amount, a determination is made that network performance is optimized.

Figure 6A:
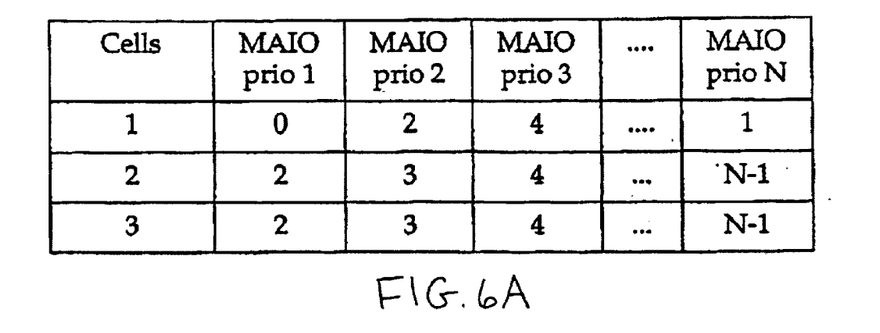
FIGS. 6A–C illustrate exemplary frequency hopping sequence allocation tables.

Now referring back to FIG. 3, the FHS allocation process, represented by block 330, involves organizing and/or storing the optimized FHS data for each cell in a convenient and usable manner. One way of organizing the optimized FHS data might involve storing the data in the form of allocation tables, which in turn, may be implemented with a data base. In so doing, the task of assigning the most appropriate FHS to a call can be easily achieved by consulting the information in the corresponding allocation table(s). FIG. 6A shows an exemplary allocation table that illustrates the allocation and prioritization of N number of MAIOs in each of three different cells. In cell 1, for example, $MAIO_0$ is identified as being priority level 1, $MAIO_2$ as priority level 2, $MAIO_4$ as priority level 3, and $MAIO_1$ as priority level N. If the first exemplary MAIO allocation method is employed, where new calls are assigned the MAIO exhibiting the highest possible priority level, a new call in cell 1, in accordance with the allocation table illustrated in FIG. 6A, would be assigned $MAIO_0$, assuming $MAIO_0$ is available for use.

Figure 6B:
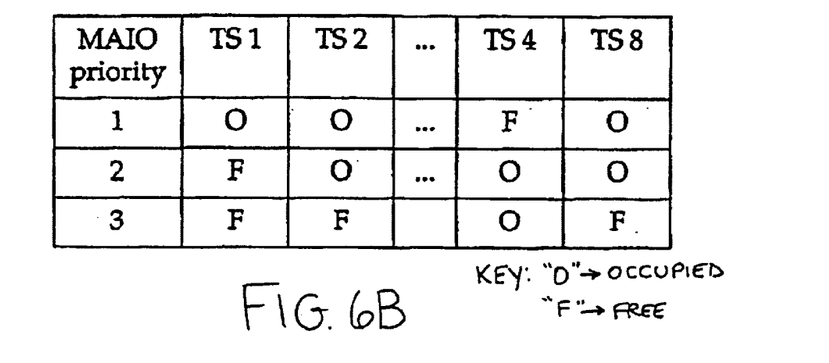

To determine whether a particular MAIO is available, an allocation table as illustrated in FIG. 6B may be employed. In GSM, there are 8 time slots $TS_1 \ldots TS_8$ per frame per frequency. Accordingly, a given MAIO may be used for 8 different calls during a single frame by assigning each of the 8 different calls to a corresponding one of the 8 time slots $TS_1 \ldots TS_8$. If $MAIO_0$ is established as priority level 1, as indicated in the allocation table of FIG. 6A, $MAIO_0$ is in use at least during time slots $TS_1$, $TS_2$ and $TS_8$. However, $MAIO_0$ is not in use during the time slot $TS_4$. Therefore, if a new call is established, it may be assigned $MAIO_0$ even though $MAIO_0$ is supporting other calls in the cell, where the new calls will be transmitting or receiving over time slot $TS_4$.

Figure 6C:
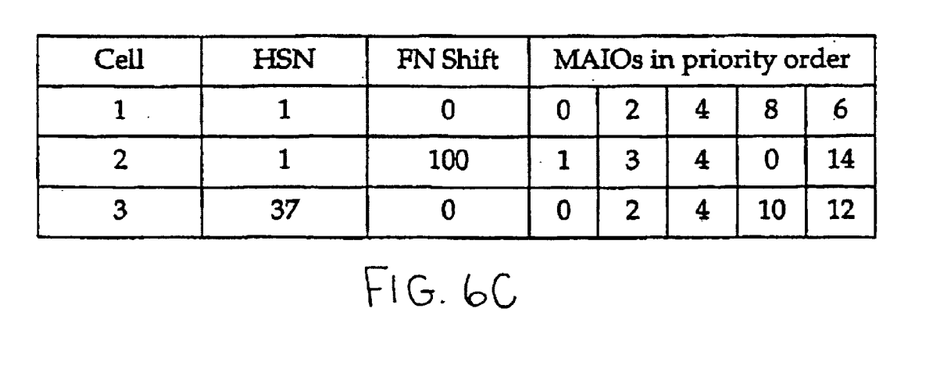

Again, each FHS is defined by a corresponding HSN, MAIO and FNS. FIG. 6C illustrates yet another allocation table, similar to the allocation table illustrated in FIG. 6A. Unlike the allocation table illustrated in FIG. 6A, however, the allocation table illustrated in FIG. 6C includes, for each of three exemplary cells, the allocated HSN, FNS, and the five highest priority MAIOs, in order of priority. Thus, for example, cell 1 has been allocated, based on the FHS allocation procedure shown in FIGS. 3 and 4, HSN and $FNS_0$. Moreover, it has been determined that for cell 1, $MAIO_0$ is priority level 1, $MAIO_2$ is priority level 2, $MAIO_4$ is priority level 3, $MAIO_8$ is priority level 4, and $MAIO_6$ is priority level 5.

The present invention provides a frequency hopping sequence allocation technique that improves network performance. The present invention achieves this by taking into consideration, among other things, collision rate information associated with the various FHS pairs.

The present invention has been described with reference to exemplary embodiments. However, it will be readily apparent to those skilled in the art that it is possible to embody the invention in specific forms other than those described above without departing from the spirit of the invention. For example, FIG. 1 illustrates a cellular radio telecommunications system that employs a one-reuse plan, though one skilled in the art will appreciate that the present invention is applicable with other reuse plans. The various aspects and exemplary embodiments are illustrative, and they should not be considered restrictive in any way. The scope of the invention is given by the appended claims, rather than the preceding description, and all variations and equivalents thereof which fall within the range of the claims are intended to be embraced therein.

What is claimed is:

1. In a cellular telecommunications network, a method for allocating a plurality of frequency hopping sequences comprising the steps of:

deriving network performance as a function of a current allocation of said plurality of frequency hopping sequences amongst a number of cells, and as a function of a network collision measure, wherein said network collision measure is a function of an expected, weighted mean network collision rate or an expected, weighted maximum network collision rate;

re-allocating one or more of said plurality of frequency hopping sequences until network performance is optimized; and maintaining the allocation of frequency hopping sequences, amongst the cells, that resulted in optimized network performance.

2. The method of claim 1, wherein the expected, weighted mean network collision rate is a function of an expected level of interference between cell pairs and an average expected collision rate between frequency hopping sequence pairs associated with each cell pair.

3. The method of claim 1, where the expected, weighted maximum network collision rate is a function of an expected level of interference between cell pairs and a maximum expected collision rate between the frequency hopping sequences.

4. The method of claim 1, wherein said step of re-allocating one or more of said plurality of frequency hopping sequences until network performance is optimized comprises the steps of:

re-allocating one or more of said plurality of frequency hopping sequences for one cell at a time.

5. The method of claim 1, wherein the maintaining of frequency hopping sequences, amongst the cells, that resulted in optimized network performance permits frequency hopping sequences to be assigned to connections in a corresponding cell in accordance with a predetermined frequency hopping sequence allocation method.

6. In a cellular telecommunications network, a method for allocating frequency hopping sequences to each of a number of cells, said method comprising the steps of:

determining an expected collision rate between each of a number of frequency hopping sequence pairs;

identifying a frequency offset allocation method;

allocating frequency hopping sequences for each cell;

determining network performance, based on the present allocation of frequency hopping sequences for each cell, and based on the expected collision rate between each of said number of frequency hopping sequence pairs;

re-allocating the frequency hopping sequences until it is determined that network performance is optimized; and based on the allocation of frequency hopping sequences that represents optimized network performance, and based on the frequency offset allocation method, constructing one or more frequency hopping sequence allocation tables which identify a prioritized listing of allocated frequency hopping sequences for each cell.

7. The method of claim 6, wherein said step of determining the expected collision rate between each of a number of frequency hopping sequence pairs comprises the steps of:

comparing two frequency hopping sequences associated with a frequency hopping sequence pair; and determining a number of occurrences where each of the two frequency hopping sequences associated with the frequency hopping sequence pair simultaneously overlap in both time and frequency domains.

8. The method of claim 7, further comprising the steps of adjusting a relative frame number shift between the frequency hopping sequences associated with the frequency hopping sequence pair; and determining the relative frame number shift that results in a minimization of the expected collision rate between the frequency hopping sequences associated with the frequency hopping sequence pair.

9. The method of claim 6, wherein said step of allocating frequency hopping sequences for each cell comprises the step of;

randomly allocating the frequency hopping sequences.

10. The method of claim 6, wherein said step of allocating frequency hopping sequences for each cell comprises the step of;

allocating the frequency hopping sequences based on previously derived collision rates for each of said number of frequency hopping sequence pairs.

11. The method of claim 6, wherein said step of determining network performance, based on the present allocation of frequency hopping sequences for each cell, and based on the expected collision rate between each of said number of frequency hopping sequence pairs comprises the step of:

calculating an expected network collision rate.

12. The method of claim 11, wherein the expected network collision rate is an expected, weighted mean network collision rate.

13. The method of claim 12, wherein the step of determining network performance further comprises the step of:

calculating the expected, weighted mean network collision rate as a function of a weighting factor associated with each of a number of cell pairs and as a function of an average collision rate between the frequency hopping sequences presently allocated to the cells which make up each cell pair, and wherein said weighting factor is a function of a level of interference between the cells which make up each cell pair.

14. The method of claim 11, wherein the expected network collision rate is an expected, weighted maximum network collision rate.

15. The method of claim 14, wherein the step of determining network performance further comprises the step of:

calculating the expected, weighted maximum network collision rate as a function of a weighting factor associated with each of a number of cell pairs and as a function of a maximum collision rate between the frequency hopping sequences presently allocated to the cells which make up each cell pair, and wherein said weighting factor is a function of a level of interference between the cells which make up each cell pair.

16. The method of claim 6, wherein said step of re-allocating the frequency hopping sequences until it is determined that network performance is optimized comprises the step of iteratively re-allocating the frequency hopping sequences one cell at a time.

17. The method of claim 6, wherein said frequency offset allocation method comprises the steps of:

in a corresponding cell, assigning an available frequency offset having a highest priority level to a new call at call set-up.

18. The method of claim 6, wherein said frequency offset allocation method comprises the step of
  in a corresponding cell, reserving a frequency offset having a highest priority level for an existing call that experiences low signal quality; and
  assigning an available frequency offset having a next highest priority level to a new call at call set-up.

19. The method of claim 6, wherein said frequency offset allocation method comprises the step of:
  in a corresponding cell, assigning an available frequency offset to a call based on an allocated priority level and information relating to frequency hopping sequence utilization in at least one other cell.

\* \* \* \* \*

UNITED STATES PATENT AND TRADEMARK OFFICE
CERTIFICATE OF CORRECTION

PATENT NO. : 6,845,123 B1
APPLICATION NO. : 09/512629
DATED : January 18, 2005
INVENTOR(S) : Nyberg et al.

It is certified that error appears in the above-identified patent and that said Letters Patent is hereby corrected as shown below:

In Column 6, Line 43, delete "HSN," and insert -- $HSN_1$ --, therefor.

In Column 10, Lines 8-10, Equation (4) delete
"$\Pi(a)(C_1, C_2, MAIO_1.MAIO_2) = PC_1(T_1, MAIO_1) * P_{C2}(T_1, MAIO_2)$"
and insert
--"$\Pi(a)(C_1, C_2, MAIO_1, MAIO_2) = PC_1(T_1, MAIO_1) * P_{C2}(T_2, MAIO_2)$"--,
therefor.

In Column 10, Lines 45, Equation (8) delete "$R_{max}(a) = \sum_{C_0=1}^{n} \sum_{C_2=1}^{n} W(C_1.C_2) * r_{max}(a)(C_1, C_2)$"

and insert

--"$R_{max}(a) = \sum_{C_0=1}^{n} \sum_{C_2=1}^{n} W(C_1, C_2) * r_{max}(a)(C_1, C_2)$"--, therefor.

In Column 11, Line 38, after "improved and" delete "By".

In Column 12, Line 45, delete "HSN," and insert -- $HSN_1$ --, therefor.

In Column 15, Line 2, in Claim 18, delete "step" and insert -- steps --, therefor.

Signed and Sealed this

Thirtieth Day of October, 2007

JON W. DUDAS
*Director of the United States Patent and Trademark Office*

UNITED STATES PATENT AND TRADEMARK OFFICE
CERTIFICATE OF CORRECTION

PATENT NO. : 6,845,123 B1
APPLICATION NO. : 09/512629
DATED : January 18, 2005
INVENTOR(S) : Nyberg et al.

It is certified that error appears in the above-identified patent and that said Letters Patent is hereby corrected as shown below:

In Column 6, Line 43, delete "HSN," and insert -- $HSN_1$ --, therefor.

In Column 10, Lines 8-10. Equation (4) delete
"$\prod(a)(C_1, C_2, MAIQ_1, MAIQ_2) = PC_1(T_1, MAIQ_1) * P_{C2}(T_1, MAIQ_2)$"

and insert
--"$\prod(a)(C_1, C_2, MAIQ_1, MAIQ_2) = PC_1(T_1, MAIQ_1) * P_{C2}(T_2, MAIQ_2)$"--, therefor.

In Column 10, Lines 45, Equation (8) delete "$R_{max}(a) = \sum_{C_0=1}^{n} \sum_{C_2=1}^{n} W(C_1, C_2) * r_{max}(a)(C_1, C_2)$"

and insert

-- "$R_{max}(a) = \sum_{C_0=1}^{n} \sum_{C_1=1}^{n} W(C_1, C_2) * r_{max}(a)(C_1, C_2)$"--, therefor.

In Column 11, Line 38, after "improved and" delete "By".

In Column 12, Line 45, delete "HSN," and insert -- $HSN_1$ --, therefor.

In Column 15, Line 2, in Claim 18, delete "step" and insert -- steps --, therefor.

Signed and Sealed this

Twenty-seventh Day of November, 2007

JON W. DUDAS
*Director of the United States Patent and Trademark Office*